United States Patent
Shehata et al.

(10) Patent No.: US 9,225,952 B2
(45) Date of Patent: Dec. 29, 2015

(54) COLOR SPACE APPEARANCE MODEL VIDEO PROCESSOR

(71) Applicant: Texas Instruments Incorporated, Dallas, TX (US)

(72) Inventors: Shereef Shehata, Allen, TX (US); Weider P. Chang, The Hills, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/699,623

(22) Filed: Apr. 29, 2015

(65) Prior Publication Data

US 2015/0264328 A1    Sep. 17, 2015

Related U.S. Application Data

(62) Division of application No. 11/849,456, filed on Sep. 4, 2007, now Pat. No. 9,049,408.

(60) Provisional application No. 60/824,324, filed on Sep. 1, 2006, provisional application No. 60/824,372, filed on Sep. 1, 2006, provisional application No. 60/824,356, filed on Sep. 1, 2006.

(51) Int. Cl.
   *H04N 9/64* (2006.01)
   *H04N 9/68* (2006.01)
   *H04N 9/67* (2006.01)

(52) U.S. Cl.
   CPC ........... *H04N 9/643* (2013.01); *H04N 9/64* (2013.01); *H04N 9/646* (2013.01); *H04N 9/67* (2013.01); *H04N 9/68* (2013.01)

(58) Field of Classification Search
   CPC ........... H04N 9/643; H04N 9/68; H04N 9/67; H04N 9/64; H04N 9/646
   See application file for complete search history.

(56) References Cited

U.S. PATENT DOCUMENTS

| | | | | |
|---|---|---|---|---|
| 6,917,444 | B1* | 7/2005 | Moriwaki | H04N 1/6005 358/1.9 |
| 8,340,410 | B1* | 12/2012 | Srinivasan | H04N 9/67 348/256 |
| 2002/0110282 | A1* | 8/2002 | Kraft | H04N 1/4092 382/261 |
| 2004/0013296 | A1* | 1/2004 | Aotsuka | H04N 1/6075 382/162 |
| 2004/0239814 | A1* | 12/2004 | Hirashima | H04N 1/628 348/649 |
| 2005/0244072 | A1* | 11/2005 | Imai | G06K 9/00664 382/254 |
| 2008/0056566 | A1* | 3/2008 | Shehata | H04N 5/57 382/167 |
| 2008/0056605 | A1* | 3/2008 | Shehata | G06K 9/38 382/274 |

FOREIGN PATENT DOCUMENTS

GB    WO 2006103469 A2 *  10/2006 ............ G06T 7/408

* cited by examiner

*Primary Examiner* — Benjamin R Bruckart
*Assistant Examiner* — Anthony Bantamoi
(74) *Attorney, Agent, or Firm* — Robert D. Marshall, Jr.; Frank D. Cimino

(57) ABSTRACT

A method of color processing determines whether a pixel color is within at least one range of predetermined colors corresponding to a viewer expected color. If so, the method altering the pixel color to better approximate the viewer expected color. For detection of skin tones determining whether the pixel color is within a range of predetermined colors includes discounting an illuminant of the pixel color. The viewer expected colors are preferably skin tone, grass green and sky blue. The saturation level of grass green and sky blue are enhanced and that of skin tones are suppressed. The saturation s is limited based upon lightness J and hue h to convert to an allowable RGB color format range.

9 Claims, 9 Drawing Sheets

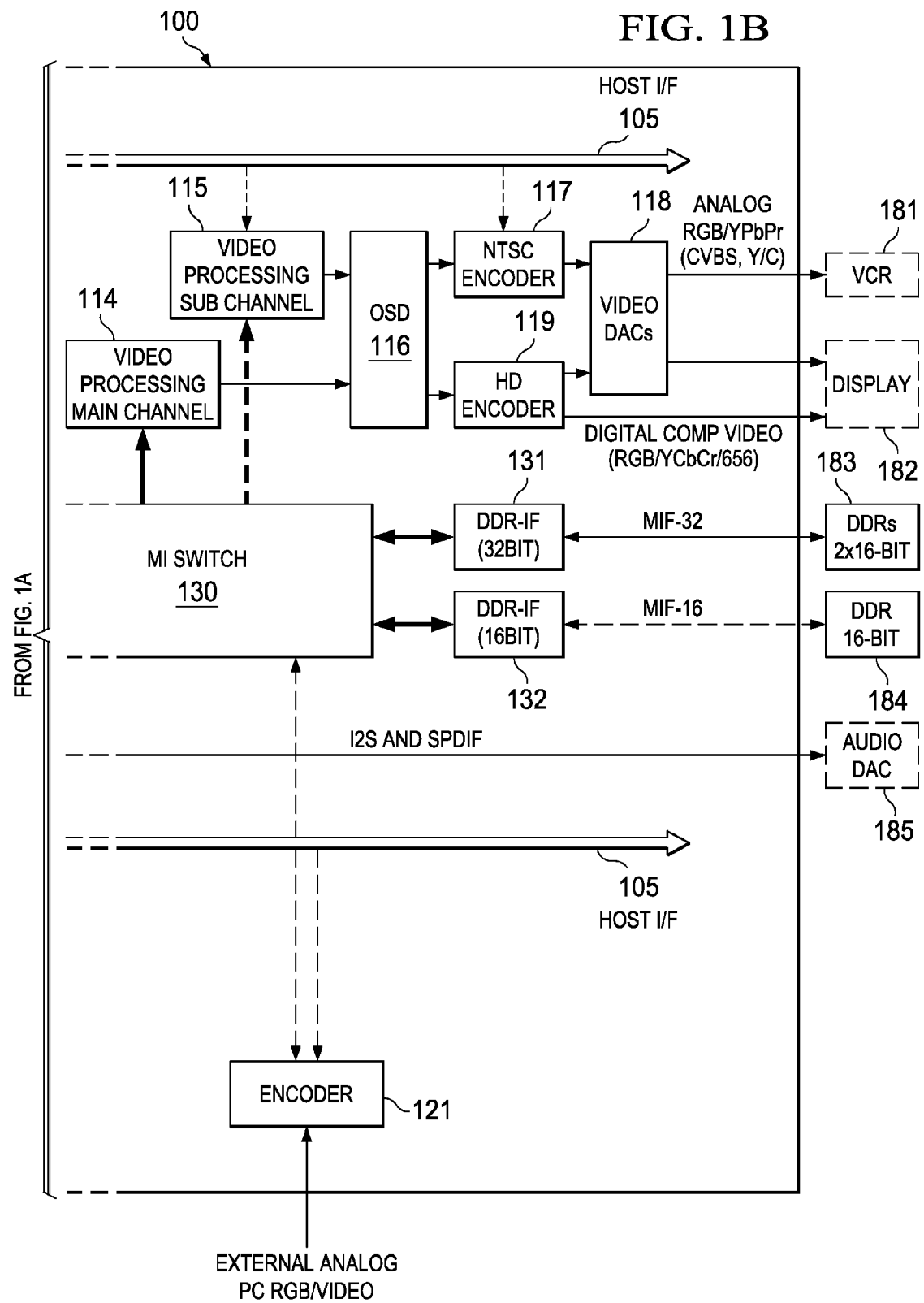

COLOR SPACE APPEARANCE MODEL VIDEO PROCESSOR

CLAIM OF PRIORITY

This application: is a divisional of U.S. patent application Ser. No. 11/849,456 filed Sep. 4, 2007.

This application claims priority under 35 U.S.C. 119(e)(1) to U.S. Provisional Application Nos. 60/842,324, 60/824,356 and 60/824,372 all filed Sep. 1, 2006.

TECHNICAL FIELD OF THE INVENTION

The technical field of this invention is digital control of color video.

BACKGROUND OF THE INVENTION

Memory colors are colors that are associated by humans with familiar objects. These colors are of prime importance in video imaging systems, as human perception of these colors is more sensitive due to the prior knowledge of the color. The most important of memory colors are mainly human skin-tones, the grass-green and the sky-blue colors. The accurate representation and if needed enhancement of these memory colors, increases the natural feel of the video image. This invention is a video processing architecture capable of the independent processing and control of the three outlined memory colors, in addition to the traditional processing usually associated with video systems. The color processing architecture is applied in the color appearance model CIECAM02 with the objective of enhancing the color appearance in the video system, while paying attention to the perception of the colors. Color manipulation has the potential of altering some other video image attributes, such as image brightness and color hues. The choice of color space is crucial, as it needs to have lines of constant hues across other dimensions such as color saturation and luminance.

The almost orthogonal separation between the color attributes such as hue and saturation and luminance in the CIECAM02 color space, allows more independent control on the color attributes when compared with traditional video processing domains such as YCbCr. Moreover, the adaptation of the CIECAM02 characteristics to the human perception of colors, implies that when some color attributes are changes, that change will be perceived by the human eye in a similar proportion.

SUMMARY OF THE INVENTION

Color processing for video systems has traditionally been performed in the YUV, YCbCr or similar color spaces. These color spaces, usually have significant interdependence between the color and luminance dimensions. The human perception factor can not easily be introduced to these color spaces, if at all. Color processing in video systems with emphasize on the human perception of memory color would be more suitable to a color space that models the perception such as the CIECAM02 color appearance model. The CIECAM02 color space has other relevant characteristics such as the constant hue lines across other dimensions, such as saturation and luminance.

This invention is a video color processing architecture in the CIECAM02 color space that manipulates memory colors such as the human skin-tones, grass-green, and sky-blue memory color. This manipulation is aimed towards the enhancement of the video viewing experience in accordance to the viewer perception of those memory colors.

Early studies in the field of color theory, by Buck & Froehlich, 1948, has shown that mean memory colors had more saturation than the corresponding natural means except for skin-tones. In a subsequent work (Bartleson, 1961), has performed a study that concluded that mean hues of the memory colors of people recall were not significantly different from the originals natural colors, but chroma was always increased.

The architecture presented here is a novel approach towards performing video color processing with the emphasis of memory color perception.

First, the detection of the memory colors is performed. The information resulting from the memory color detection is then passed through to the color processing architecture unit. The color processing is performed on the two dimensions, the hue and saturation of the color appearance model CIECAM02. Memory color detection gives the architecture the advantage of taking preference factors for these colors in both the hue and saturation dimension in color processing. This enables greater flexibility in the enhancement of colors, but also enables the controlled limitation of processing for some colors such as skin tone to keep from over processing skin-tones that could lead to un-natural looking video.

BRIEF DESCRIPTION OF THE DRAWINGS

These and other aspects of this invention are illustrated in the drawings, in which:

FIGS. 1A and 1B together illustrate an ATSC DTV processor targeted for integrated ATSC DTV receivers such as suitable to perform this invention;

DETAILED DESCRIPTION OF PREFERRED EMBODIMENTS

Figure 1A:
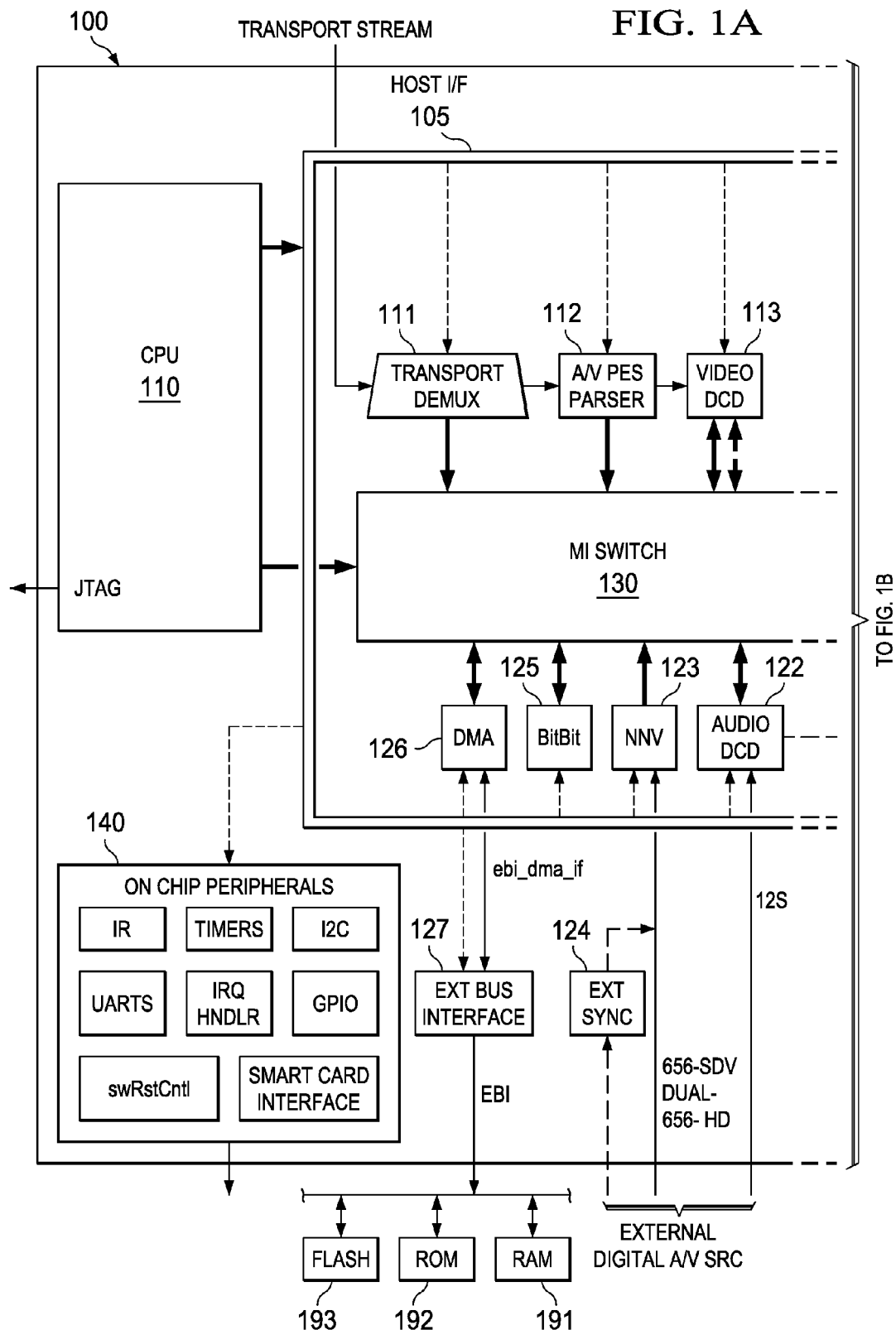

FIGS. 1A and 1B together illustrate an ATSC DTV processor 100 targeted for integrated ATSC DTV receivers such as suitable to perform this invention. ATSC DTV processor 100 is a System on Chip (SoC) device that integrates the main functions of a DTV receiver. Most functions are controlled by central processing unit (CPU) 110 via host interface (I/F) bus 105. Transport demultiplexer 111 includes support for Digital Cable input. Audio/video Packetized Elementary Stream (A/V PES) Parser 112 receives video, audio, and subpicture payloads contained within a program stream. A/V PES parser 112: saves elementary video stream in an SDRAM compressed video or audio buffer; extracts and stores Presentation Time Stamps (PTS) from the video or audio stream; helps synchronize respective audio and video presentations with System Time Stamp (STS) values; manages variable length decoder (VLD) activity; receives PES from transpose demuxer 112; and manages audio and video buffers. Video decoder 113 can decode all ATSC DTV video formats. Display processor including video processing main channel 114 and video processing subchannel 115 can convert any ATSC DTV format to any other format, including non-standard display resolutions support for panel based DTVs. On Screen Display (OSD) controller 116 supports applications with sophisticated Graphical User Interface (GUI). NTSC/PAL encoder 117 produces a NTSC or PAL compatible digital signal. Video digital to analog converters (DAC) 118 convert the signal from NTSC/PAL encoder 117 into standard analog signals. These can be used by external analog video cassette recorder (VCR) 181 and display 182. High Definition (HD) encoder 119 produces a digital video composite signal in Red/Green/Blue (RGB) format or in luminance, blue chrominance and red chrominance (YCbCr) format suitable for use by display 182 as an HD display. Encoders 116 and 118 can provide video output in YC/RGB analog/digital output up to 1080p resolution, including non-standard resolutions support for panel based DTV receivers.

NTSC/PAL/SECAM video decoder 121 can decode all popular base-band analog video formats into digital component video. Audio decoder 122 receives and decodes digital audio input in plural standard formats. NNV 123 receives and decodes external digital data in conjunction with external synchronizer 124. Bit block (BitBlt) transfer block 125 cooperates with on screen display 115 for image block moves. Direct memory access (DMA) engine 126 supports 1 Logical Channel (per RTBUF) for SDRAM write access and transfers up to 5 sections of a single RTBUF to 5 separate table stores in SDRAM. Extension bus interface 127 interfaces processor 100 with external memory such as RAM 191, ROM 192 and FLASH memory 193. Extension bus interface 127 coupled to host I/F bus 105 and includes a direct connection to DMA engine 126.

Processor 100 requires external memory for the video and audio decoder and application software. Memory interface (MI) switch 130 couples most of the previously mentioned blocks to unified double data rate (DDR) 32-bit memory interface 131 and a second independent 16-bit DDR memory interface 132. These DDR memory interfaces couple to respective DDR 2 by 16-bit memory 183 and DDR 16-bit memory 184. MI switch 130 and DDR memory interfaces 131 and 132 provide with adequate bandwidth to support high performance HDTV applications.

On-chip peripherals block 140 includes: programmable IR input and output interfaces; Inter Integrated Circuit (I2C) serial bus interfaces that can act as master or slave; universal asynchronous receiver/transmitter (UART) serial data interfaces; general purpose input/output (GPIO) ports; plural programmable timers; a IRQ interrupt handlers; software reset controller (swRstCmtl); and a SmartCard interface.

CPU 110 is primarily responsible for interactive applications, control functions, low-end graphics processing, and running operating systems such as Linux, µCOS, and others. CPU 110 is used for certain packet processing tasks such as clock recovery and hardware section filtering. During normal operation, CPU 110 constantly responds, based on a programmable priority, to interrupt requests from any of the hardware modules and devices on the Extension Bus. These interrupt service requests include transport packet parsing, program clock recovery, traffic controller and OSD service requests, service or data transfer requests from extension bus interface 127. Once data enters memory, such as DDR memory 183 and 184 it may be processed by the application running on CPU 110 or automatically processed by one of the processor blocks. DMA engine 126 minimizes CPU overhead associated with memory data transfers at the application level.

Figure 2:
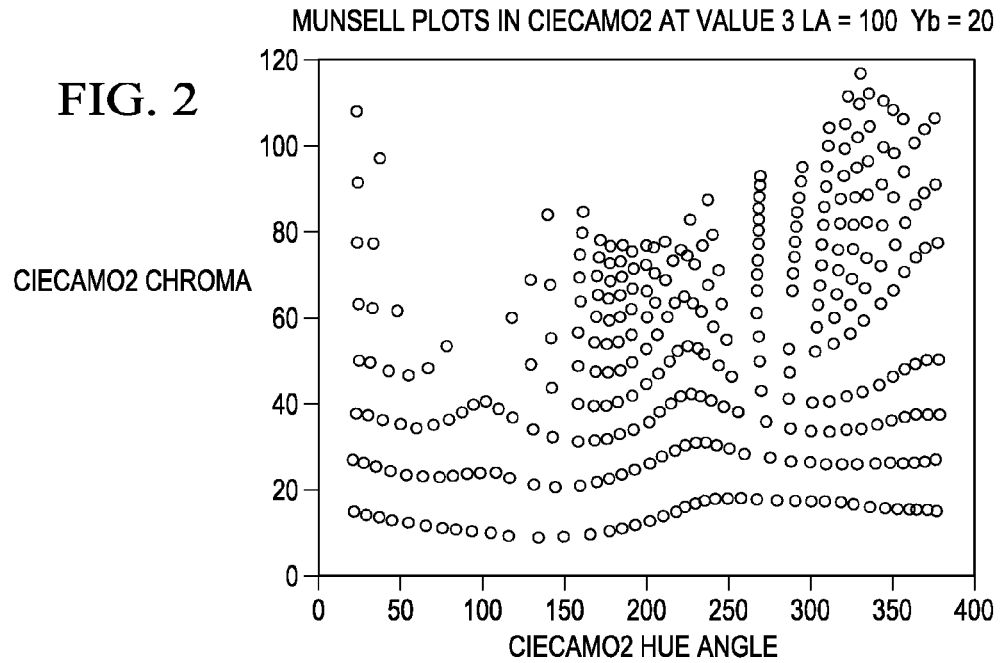
FIG. 2 illustrates constant hue lines in the CIECAM02 format versus chroma value.

As FIG. 2 shows, the CIECAMO2 constant hue lines are linear for most of the chroma values. However, there are slight hue shifts at high values of chroma. These values should checked relative to the allowable color gamut, i.e. allowable RGB values. Any out of gamut colors due to processing are brought inside the allowable color gamut along the constant hue lines to prevent hue shifts.

Figure 3:
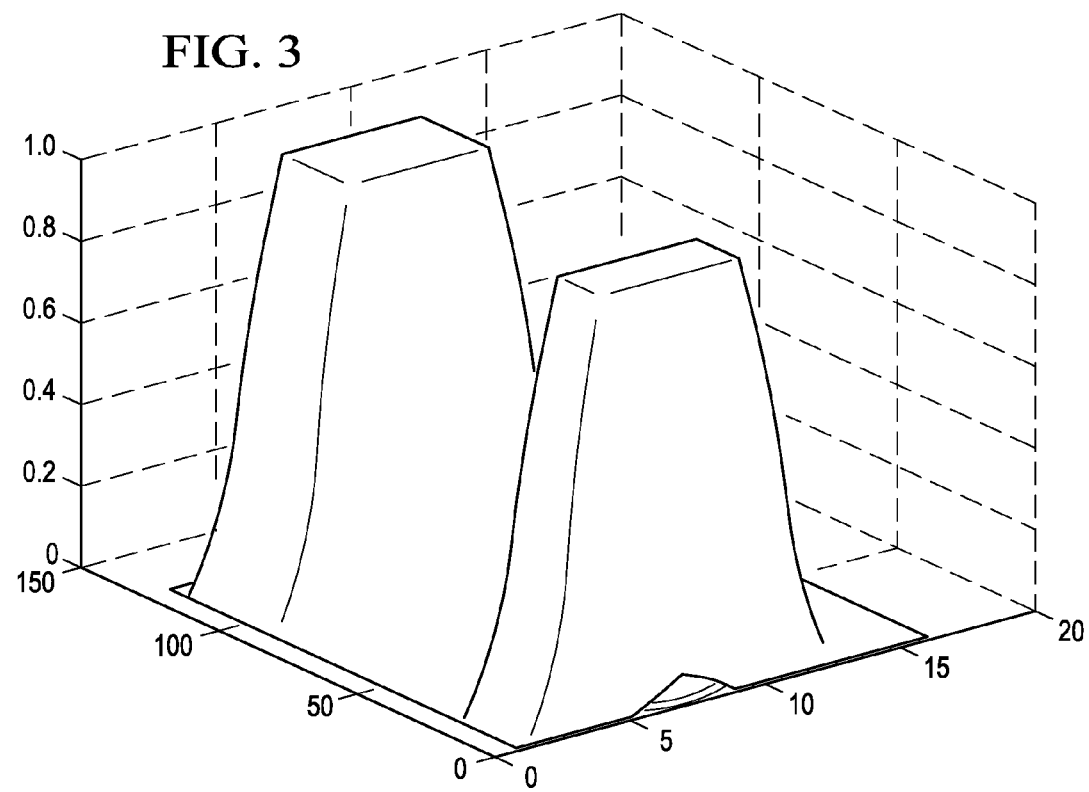
FIG. 3 illustrates a pictorial representation of a possible probability density function of a skin-tone pixel in the CIECAM02 color space acceptable in variety of video sequences.

FIG. 3 illustrates a pictorial representation of a possible probability density function of a skin-tone pixel in the CIECAMO2 color space. This probability density function is acceptable in variety of video sequences.

Figure 4:
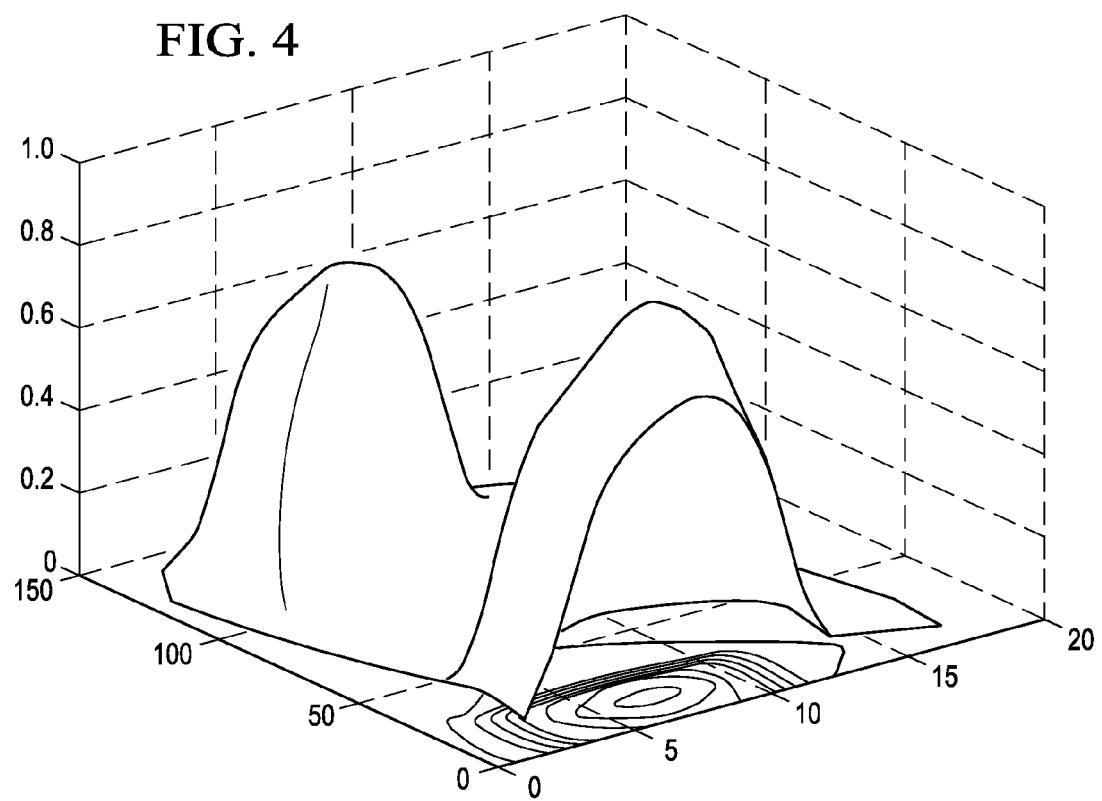
FIG. 4 illustrates a probability density function for detection of skin-tone pixels altered based upon experimental data derived from real video sequences.

FIG. 4 illustrates a probability density function for detection of skin-tone pixels altered based upon experimental data derived from real video sequences.

Figure 5:
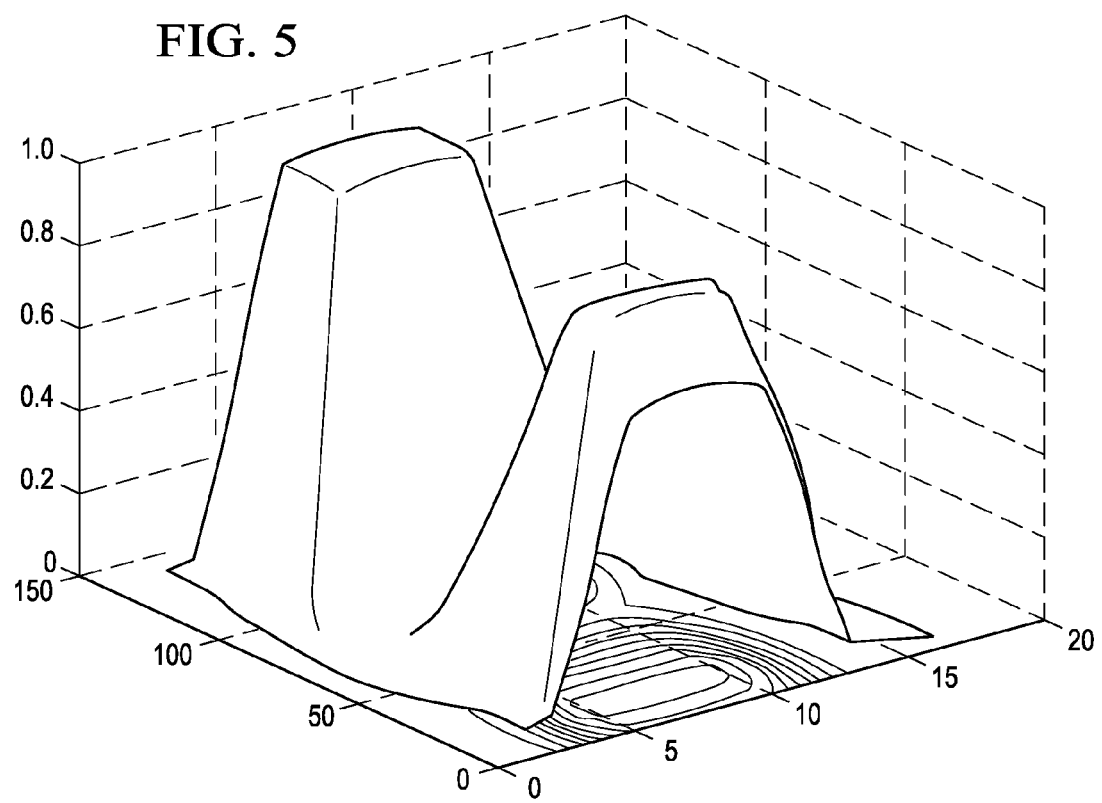
FIG. 5 illustrates a probability density function for skin-tone detection incorporating the light casting effect that can be observed in variety of video sequences.

FIG. 5 illustrates a probability density function for skin-tone detection incorporating the light casting effect that can be observed in variety of video sequences.

Figure 6:
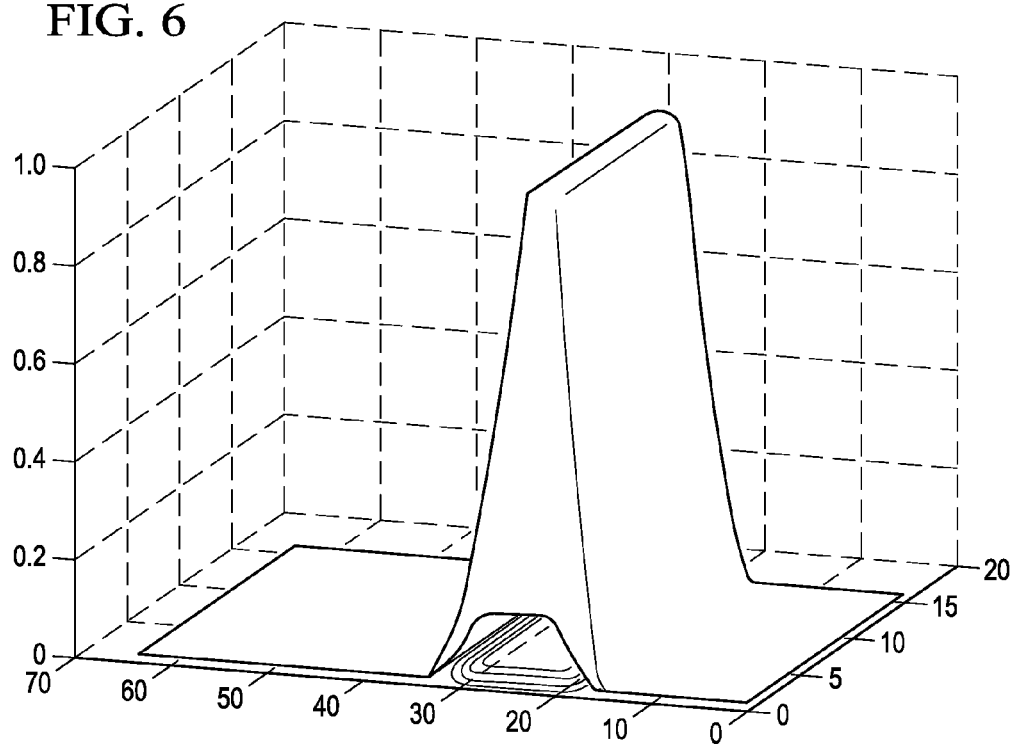
FIG. 6 illustrates a probability density function of the grass color using the dual axes of the CIECAM color space, hue and saturation.

FIG. 6 illustrates a probability density function of the grass color using the dual axes of the CIECAM color space, hue and saturation. The steepness which correlates to the roll-off of the pdf function is preferably programmable.

Figure 7:
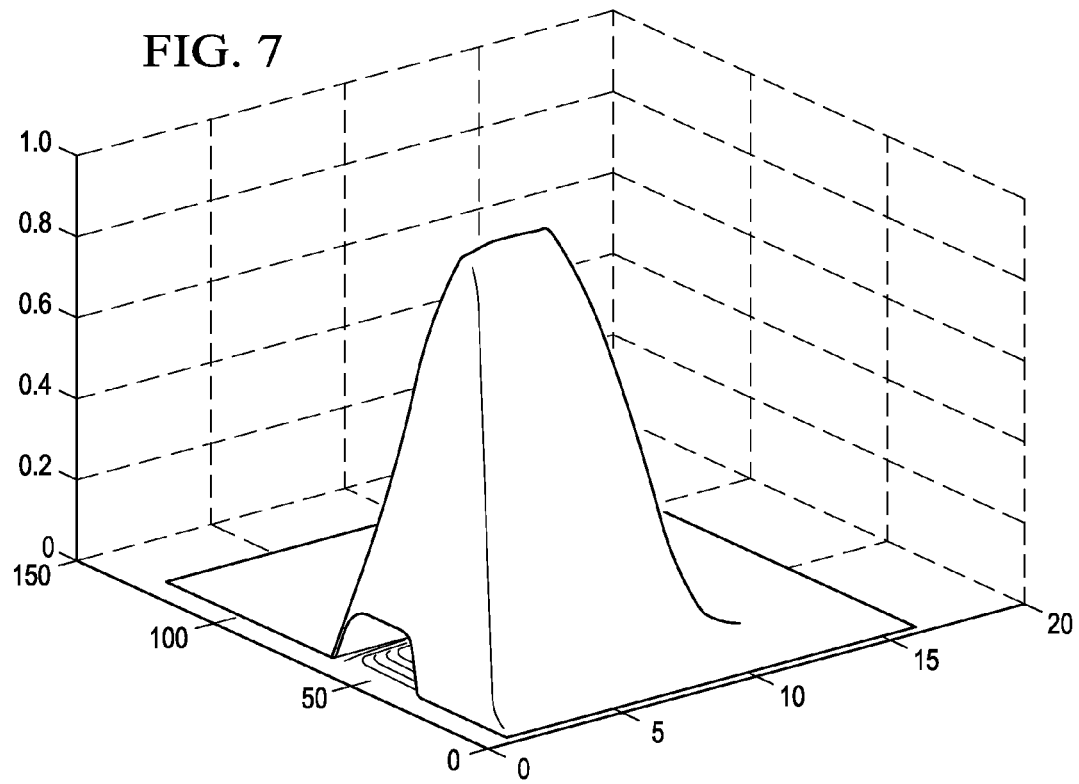
FIG. 7 illustrates an alteration of the probability density function of FIG. 6 which could be used to control the grass-green color processing according to this invention.

FIG. 7 illustrates an alteration of the probability density function of FIG. 6 which could be used to control the grass-green color processing according to this invention.

Figure 8:
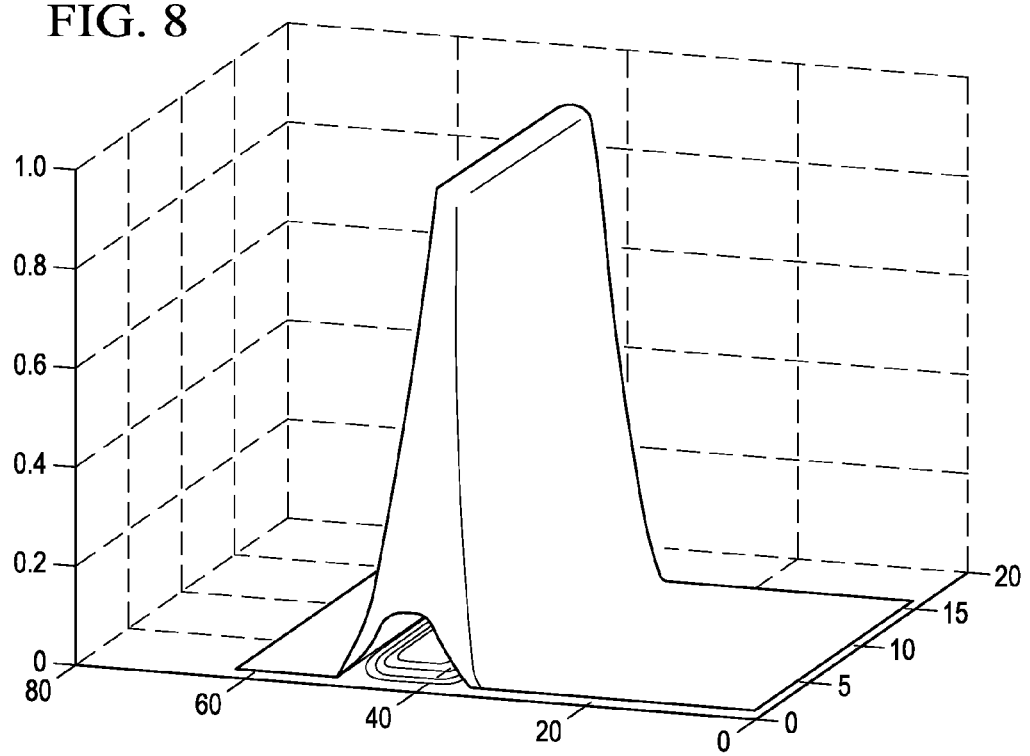
FIG. 8 illustrates a probability density function of the sky color using the dual axes of the CIECAM color space, hue and saturation.

FIG. 8 illustrates a probability density function of the sky color using the dual axes of the CIECAM color space, hue and saturation.

Figure 9:
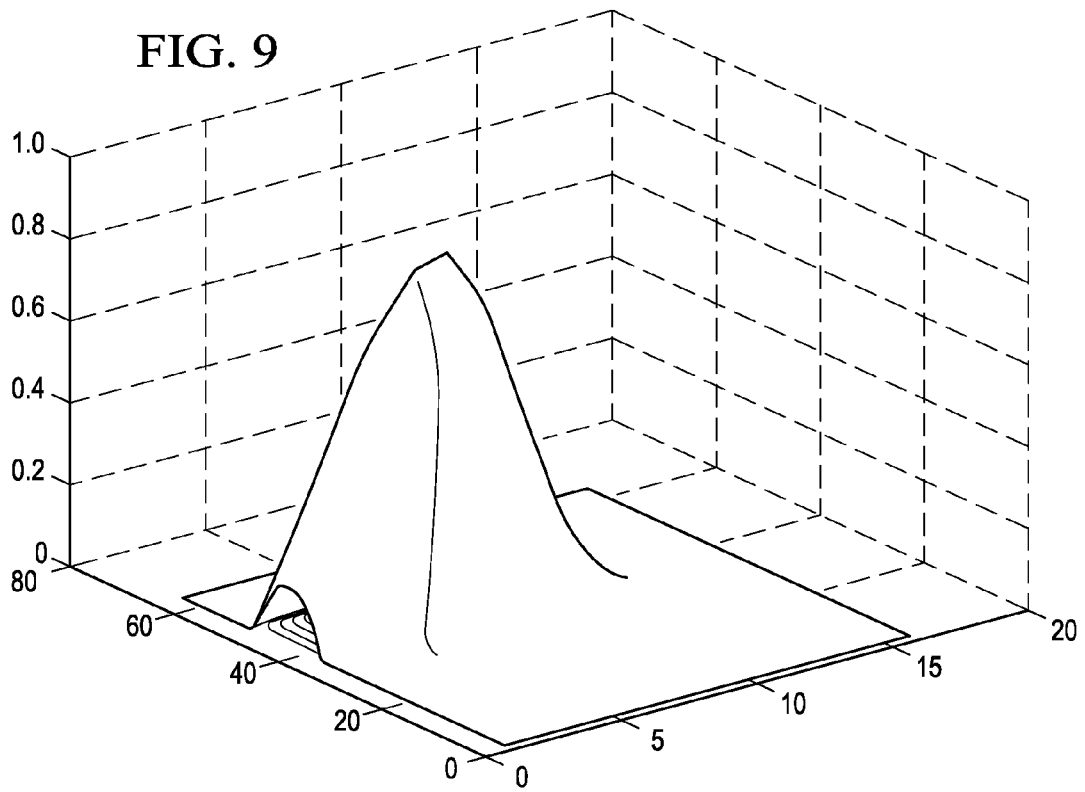
FIG. 9 illustrates an alteration of the probability density function of FIG. 8 which could be used to control the sky color processing according to this invention.

FIG. 9 illustrates an alteration of the probability density function of FIG. 8 which could be used to control the sky color processing according to this invention.

Video frames that incorporate the light sources of different color hues casting on the skin-tones of people have the highest probability of misdetection. FIG. 5 illustrates a probability density function altered to detect skin-tones in such light. This probability density function of FIG. 5 allows for non-zero values.

Independent control of memory colors allows production of a saturated grass-green color expected by viewer as a memory color. This invention minimizes change to skin tones, eliminating burnt out red skin tones. The overall effect is a rich image that coincides with viewer perception.

This invention models the distribution of the skin color of people from various races and under different illuminations in video frames by chrominance clusters in the CIECAM02 color space and by a multivariate Gaussian Mixture color model. By measuring the probability of a given pixel being a skin pixel belonging to a skin cluster, this invention identifies skin and non-skin colors.

This invention discounts the illuminant and the CIECAM02 luminance channel information. Shadowing, lighting effects and interference by various skin related colors such as skin-similar colored features like hair, facial hair, makeup and such can cause variation of the CIECAM02 luminance channel value across human face or skin. Thus pixels cannot be reliably separated into skin and non-skin pixels based on the luminance channel. This invention employs both the hue and saturation channels of the CIECAM02 color space. It is known that skin information of different people and races differ much less in color than in luminance. Thus skin colors of different people are more clustered in color space than the luminance of the skin indicate.

To account for this, one approach is to model the skin using only color information rather than color plus luminance information in the CIECAM02 color space. This reduces the complexity of the classification and probability estimates without significant loss of generality. Another approach models the skin pixels with k-means clusters for k-levels of pixel luminance. A practical number of levels would be 3 or more to account for shadow, highlight and mid-tone luminance ranges. A k-means clustering algorithm can be described as follows.

A given a set of pixels is split into k-clusters. Each cluster has a mean value $\mu_1$ to $\mu_k$. A pixel is assigned to a cluster i where the value of $(x-\mu_i)$ is smallest. The distance measure could be a Euclidean distance or Mahalanobis distance. An initial estimate and initial cluster assignment is used to determine the cluster means. The cluster means and variances are then recomputed and an iterative assignment-mean recomputed sequence is repeated to convergence.

Chromatic adaptation performed during the forward CIECAM02 transformation is used to map the video frame information into the CIECAM02 color space while discounting the illuminant. This is accomplished by implicit mapping the RGB input video frame information to the CIE XYZ domain while adapting the white point from the source into the equal energy point E (X=100, Y=100, Z=100). Lastly, the CIECAM02 luminance J, hue H and saturation S values are computed.

Discounting the illuminant achieves reliable skin probability detection in the CIECAM02 color space by reducing the cluster-weakening effect from the illuminant. If illuminant were not discounted, skin color would change in both the CIECAM02 luminance channel values (J-channel values) and in the chrominance component. A high color temperature white point (correlated color temperature larger than 10,000 Kelvin) would skew the skin chrominance towards blue. A color temperature D55 (correlated color temperature of 5500 Kelvin) would skew the skin color towards yellow. The same skin tone pixels would be clustered into widely different chrominance values under theses two illuminants (D55 and 10,000 Kelvin). These pixels would be clustered much closer under the same illuminant E.

This invention uses a Multivariate Gaussian Mixture Model. In CIECAM02 with an equal energy illuminant E, the conditional probability for a video frame pixel to be a skin color pixel is modeled as a mixture of multiple probabilities. Each component is assumed to be a Gaussian with its own mean and covariance matrix. A mixture parameter determines the contribution of each component to the skin probability.

Assuming that the image is made of g segments, then a pixel is part of the i-th segment with probability $\pi_i$. The density function associated with each probability is modeled as a Gaussian distribution with parameters:

$$\theta_i = (\mu_i, \Sigma_i) \quad (1)$$

where: $\mu_i$ is the mean; and $\Sigma_i$ is the covariance.

Under this model each skin color pixel x can be viewed as arising from a finite number mixture of Gaussians in some proportions $\pi_1, \ldots \pi_g$, where $$\sum_i^g \pi_i = 1$$

and $\pi_i \geq 1$.

The probability density function of an observation x of a given dimensionality can be described as:

$$p(x) = \sum_i^g \pi_i \cdot p(x | \theta_i) \quad (2)$$

Which is given as:

$$p(x) = \sum_i^g \pi_i \cdot p(x|\theta_i) = \sum_i^g \pi_i \cdot \frac{1}{(2\pi)^{d/2} \cdot |\Sigma_i|^{1/2}} \exp\left\{-\frac{1}{2}(x-\mu_i)^T(x-\mu_i)\right\} \quad (3)$$

Several techniques can be used for the clustering of the pixel color data including vector quantization and k-means clustering. The Estimation Maximization or EM algorithm can be used for parameter estimation to determine the parameters of multivariate mixture model from a set of training data. The Estimation Maximization (EM) method provides an effective maximum likelihood classifier for fitting the data into the Gaussian mixture model. If the number of training samples is small, the EM algorithm performs data clustering in the data space. If the number of training samples and the structure, such as the number of components in the multivariate Gaussian model g, is known in advance, then the EM algorithm could converge to the almost-true model parameters. Training data using manually labeled skin-pixels in hundreds of images are used and considered as ground truth. This manually labeled ground truth used for training multivariate Gaussian mixture model g=2 as well as g=4. The EM algorithm builds the components of the Gaussian mixture model. Good matching has been observed between the trained model and the ground truth data.

Figure 10:
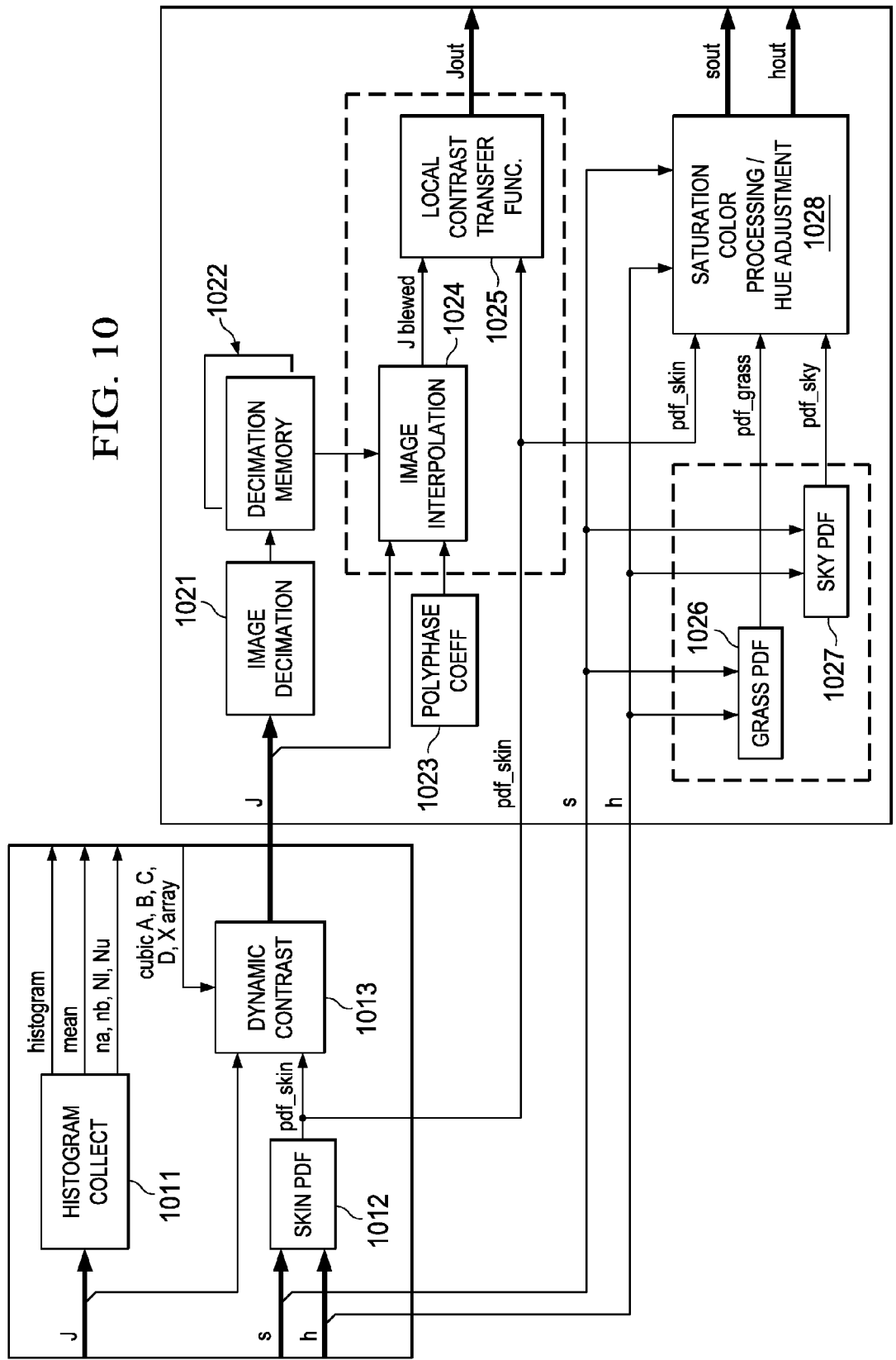
FIG. 10 illustrates an apparatus capable of performing the color adjustments of this invention.

FIG. 10 illustrates an apparatus capable of performing the color adjustments of this invention. The inputs are the Jhs video components lightness J, hue h and saturation s. Histogram collect block 1011 forms outputs of a histogram of the J values, the mean J value and the quantities na, nb, Nl and Nu. These values are used in other processing (not shown).

The saturation s and hue h video components supply inputs to the skin probability density function block 1012. As noted above the skin probability density function is programmable to meet the current needs. The output is selected probability density function for detecting skin pixels pdf_skin. This pdf_skin supplies an input to dynamic contrast block 1013, local contrast transfer function 1025 and saturation color/processing hue adjustment block 1028.

Dynamic contrast block 1013 receives the lightness J and pdf_skin and outputs an adjusted value of J. Dynamic contrast block 1013 supplies this adjusted value of J to image decimation unit block and to image interpolation block 1024. It is known in the art that the human eye is less discriminating to chrominance that luminance data. Thus this invention uses decimated lightness J in adjustment based upon the determined pdf_skin. The decimated J data is temporary stored in decimation memory 1022. Polyphase coefficient block 1023 generates interpolation coefficients for image interpolation block 1024. Image interpolation block 1024 interpolates the decimated J data from decimation memory 1022 and the adjusted J data from dynamic contrast block 1013. The resulting $J_{blewed}$ is supplied to local contrast transfer function block 1025 along with the pdf_skin data.

Grass probability density function block 1026 generates the probability density function for detection of grass green. Ski probability density function block 1027 generates the probability density function for detection of sky blue.

Saturation color processing/hue adjustment block 1028 receives the input saturation s and hue h plus the three probability density functions pdf_skin, pdf_grass and pdf_sky. Saturation color processing/hue adjustment 1028 determines whether an input pixel saturation s and hue h are detected as skin, grass or sky based upon the probability density functions pdf_skin, pdf_grass and pdf_sky. Any pixel determined to be skin, grass or sky is adjusted in saturation and hue toward the human perceived "memory color." In accordance with this invention people expect skin, grass and sky to be within a narrow range of colors. The apparatus of FIG. 10 adjusts pixels determined to be skin, grass or sky toward their expected memory color values while minimally adjusting other pixels. This memory color adjustment provides a more pleasing appearance in the resulting image.

Figure 11:
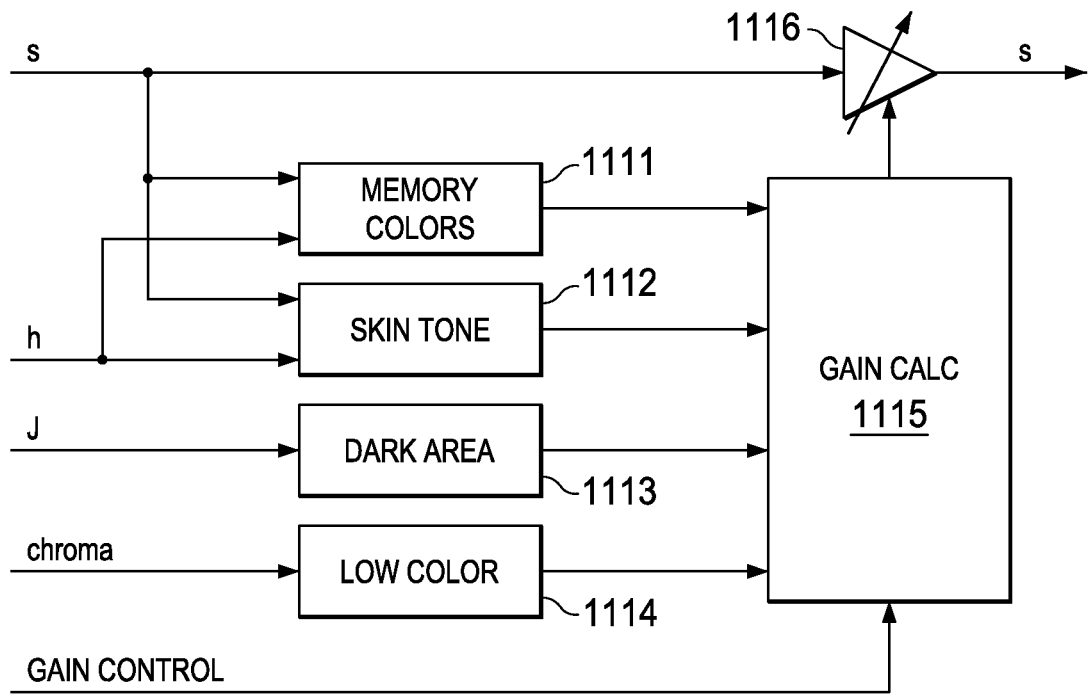
FIG. 11 illustrates a further refinement of this invention which manipulates the color saturation channel to increase the colorfulness of the images.

FIG. 11 illustrates a further refinement of this invention which manipulates the color saturation channel to increase the colorfulness of the images. Memory colors block 1111 detects the presence of grass green or sky blue pixels from hue h and saturation s inputs. Skin tone block 1112 detects the presence of skin tone pixels from hue h and saturation s. These color detections were described above in conjunction with respective blocks 1026, 1026 and 1012. Dark area block 1113 detects pixels in dark areas from the lightness J. A pixel is dark if the lightness J is below a predetermined threshold. Low color block 1114 detects pixels in areas of low color from the chroma signal.

Detection information from each of these detection blocks supplies inputs to gain calculation block 1115. Gain calculation block 115 is further responsive to a gain control signal. Gain calculation block 1115 controls the gain of variable gain amplifier block 1116. Variable gain amplifier block 1116 receives the saturation s and produces an adjusted saturation s'.

Gain calculation block 1115 operates as follows. Gain calculation block 1115 increases the gain of variable gain amplifier block 116 to boost adjusted saturation s' upon detection of one of the memory colors by memory colors block 1111. This provides a more colorful presentation of the memory colors grass green and sky blue. Gain calculation block 1115 suppresses the gain of variable gain amplifier block 116 to reduce adjusted saturation s' upon detection of skin tone by skin tone block 1112. This prevents over-saturating skin tones and producing a sun burn effect. Gain calculation block 1115 suppresses the gain of variable gain amplifier block 116 to reduce adjusted saturation s' upon detection of a dark area by dark area block 1113 or detection of low color by low color block 1114. This gain suppression avoids enhancing chroma noise.

Figure 12:
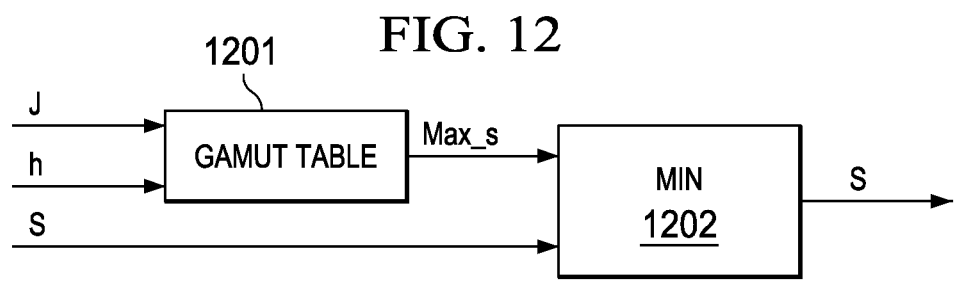
FIG. 12 illustrates a circuit that corrects a potential that the RGB value resulting from the inverse ciecam02 format conversion will become invalid as color saturation is enhanced.

FIG. 12 illustrates a yet further aspect of this invention. As color saturation is enhanced, there is a potential that the RGB value resulting from the inverse ciecam02 format conversion will become invalid. FIG. 12 illustrates a circuit that corrects this condition. Gamut table 1201 preferably stores 1024 values organized as a two-dimensional table. Gamut table 1201 stores maximum s values for evenly spaced J and h samples such that the value converts to an RGB format output within range. Gamut table 1201 thus defines the gamut boundary in Jhs color space.

Gamut table 1201 receives the hue h and the lightness J inputs in Jhs format. Gamut table 1201 outputs the maximum saturation value Max_s for the encountered h and J values. Minimum block 1201 selects the minimum of the incoming saturation or Max_s. This clipped value is used upon inverse ciecam02 conversion.

The values of Gamut table 1201 are computed off-line. These values depend on the characteristic and the viewing conditions of the target display. It is feasible to provide multiple Gamut tables where the Gamut table used is selected based upon simulated color temperature.

Figure 13:
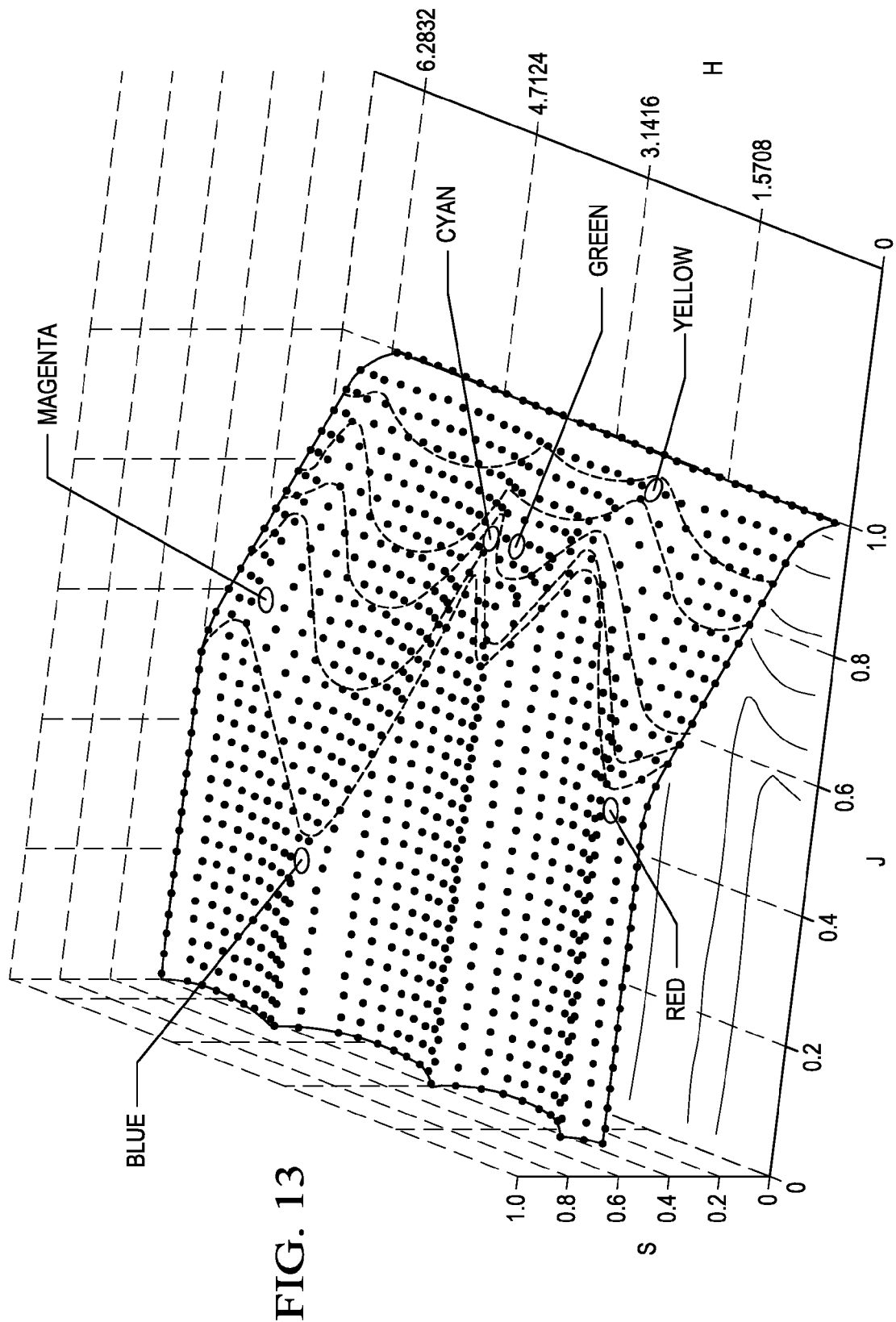
FIG. 13 illustrates Gamut Table visualization in the CIECAMO2 Jhs color space.

FIG. 13 illustrates Gamut Table visualization in the CIECAM02 Jhs color space. FIG. 13 illustrate the projection of the primary and secondary pure colors (Red, Green, Blue, Cyan, Magenta and yellow) into the ciecam02 Jhs color space.

What is claimed is:

1. A color processing apparatus comprising:
   an input for receiving color pixel information of a video consisting of plural frames of a rectangular two dimensional array of pixels in a first color format;
   a color space converter receiving the color pixel information for each pixel and converting the color pixel information from the first color format to a Jhs format consisting of lightness J, hue h and saturation s for each pixel;
   a color processor having an input receiving color pixel information converted into the Jhs format including
      a memory color block comparing a lightness J and a hue h color pixel information for each pixel with at least one range of predetermined colors corresponding to a viewer expected color and determining whether the pixel color of the pixel is within the at least one range of predetermined colors corresponding to a viewer expected color,
      a gain controlled amplifier having an input receiving the saturation s of each pixel, an output and a gain control input, the gain controller amplifier amplifying a signal at the input an amount corresponding to a signal at the gain input, and
      a gain calculation unit connected to the memory color block and the gain controlled amplifier operable to control the gain of the gain controlled amplifier corresponding to the determination whether the pixel color of the pixel is within the at least one range of predetermined colors corresponding to a viewer expected color of the memory color block.

2. The color processing apparatus of claim 1, wherein:
   at least one range of predetermined colors corresponding to a viewer expected color of the memory block corresponds to grass green.

3. The color processing apparatus of claim 2, wherein:
   the gain calculation unit boost the gain of the gain controlled amplifier upon detection of grass green.

4. The color processing apparatus of claim 1, wherein:
at least one range of predetermined colors corresponding to a viewer expected color of the memory block corresponds to sky blue.

5. The color processing apparatus of claim 4, wherein:
the gain calculation unit boost the gain of the gain controlled amplifier upon detection of sky blue.

6. The color processing apparatus of claim 1, wherein:
the color processor further includes
- a skin tone detector comparing a hue h and a saturation s color pixel information for each pixel with a range of predetermined colors corresponding to a skin tone and determining whether the pixel color of the pixel is within the range of predetermined colors corresponding to a skin tone,
- the gain calculation unit connected to the skin tone detector and operable to suppress the gain of the gain controlled amplifier upon detection of skin tone.

7. The color processing apparatus of claim 1, wherein:
the color processor further includes
- a dark area detector comparing a lightness J color pixel information for each pixel with a predetermined threshold and determining the pixel color of the pixel is within a dark area when the lightness J is below the predetermined threshold,
- the gain calculation unit connected to the skin tone detector and operable to suppress the gain of the gain controlled amplifier when the pixel is in a dark area.

8. The color processing apparatus of claim 1, wherein:
the color processor further includes
- a low color detector comparing a chrominance value color pixel information for each pixel with a predetermined threshold and determining the pixel color of the pixel is within a low color area when the chrominance value is below the predetermined threshold,
- the gain calculation unit connected to the skin tone detector and operable to suppress the gain of the gain controlled amplifier when the pixel is in a low color area.

9. The color processing apparatus of claim 1, further comprising:
- a Gamut table receiving a hue input value h and a lightness input value J for a pixel encoded in the Jhs color format, said Gamut table storing a maximum saturation value s for each of a plurality of a range of equally spaced h and J values that converts from the Jhs color format into a RGB color format within a valid range, said Gamut table outputting one of the maximum saturation values s corresponding to the hue input value h and the lightness input value J for the pixel; and
- a minimum value circuit having a first input receiving the maximum saturation value s corresponding to the hue input value h and the lightness input value J for the pixel, a second input receiving the saturation value s for the pixel and an output, said minimum value circuit providing at the output the minimum of the maximum saturation value s for the pixel and the saturation value s for the pixel.

* * * * *